(12) United States Patent
Lang et al.

(10) Patent No.: US 10,827,687 B2
(45) Date of Patent: Nov. 10, 2020

(54) BALE DROP MECHANISM (71) Applicant: Deere & Company, Moline, IL (US)

(72) Inventors: Eric R. Lang, Newhall, IA (US); Joachim Tiedeke, Frauenfeld (CH)

(73) Assignee: DEERE & COMPANY, Moline, IL (US)

( * ) Notice: Subject to any disclaimer, the term of this patent is extended or adjusted under 35 U.S.C. 154(b) by 252 days.

(21) Appl. No.: 15/965,142

(22) Filed: Apr. 27, 2018

(65) Prior Publication Data

US 2018/0338428 A1 Nov. 29, 2018

Related U.S. Application Data (60) Provisional application No. 62/510,049, filed on May 23, 2017.

(51) Int. Cl.
*A01F 15/08* (2006.01)

(52) U.S. Cl.
CPC .............................. *A01F 15/0875* (2013.01)

(58) Field of Classification Search
CPC .... A01F 15/0875; B30B 9/3014; B30B 15/32
USPC ........................... 100/188 R, 7, 218, 188 BT
See application file for complete search history.

(56) References Cited

U.S. PATENT DOCUMENTS

| | | | | |
|---|---|---|---|---|
| 2,948,213 A * | 8/1960 | Jay | ...................... | A01F 15/0875 100/99 |
| 5,742,010 A | 4/1998 | Griffin | | |
| 6,232,565 B1 * | 5/2001 | Gottlober | ............ | A01F 15/0875 177/136 |
| 9,526,213 B2 * | 12/2016 | Demon | ............... | A01F 15/0875 |
| 2012/0189417 A1 * | 7/2012 | Blough | ............... | A01F 15/0883 414/519 |
| 2015/0216125 A1 | 8/2015 | Olander et al. | | |

FOREIGN PATENT DOCUMENTS

| | | | | |
|---|---|---|---|---|
| EP | 0974259 A1 * | 1/2000 | ......... | A01F 15/0875 |
| EP | 0974259 A1 | 1/2000 | | |
| EP | 1266563 A1 | 12/2002 | | |
| EP | 2477476 B1 | 8/2013 | | |
| EP | 2923560 A1 * | 9/2015 | ............. | A01D 90/10 |
| EP | 2923560 A1 | 9/2015 | | |
| EP | 3254554 A1 | 12/2017 | | |

OTHER PUBLICATIONS

Extended European Search Report for Application No. 18172081.4 dated Oct. 22, 2018 (10 pages).

\* cited by examiner

*Primary Examiner* — Shelley M Self
*Assistant Examiner* — Teresa A Guthrie
(74) *Attorney, Agent, or Firm* — Michael Best & Friedrich LLP (57) ABSTRACT

A bale drop detection mechanism for use with a baler having a rear aperture. The bale drop detection mechanism including a bale chute coupled to the rear aperture of the baler, where the bale chute includes an upper surface configured to support a bale ejected from the rear aperture thereon. The bale drop detection mechanism also including a bracket coupled to the rear aperture of the baler, a support member extending between and coupled to both the bale chute and the bracket, and a controller in operable communication with the bale chute and configured to detect a bale drop event based at least in part on the level of force being applied to the upper surface of the bale chute.

20 Claims, 5 Drawing Sheets

BALE DROP MECHANISM

FIELD OF THE INVENTION

The present disclosure relates to a bale drop detection system, and more specifically to a bale drop detection system having no moving parts.

BACKGROUND

During the baling process, the size of the baler often prevents the operator from seeing around and behind the baler. As such, if a bale is dropped from the device and the operator is not made aware, the operator may back-up and damage the bale.

In current balers, some designs use mechanical switches able to detect the presence of a bale. These systems are often times faulty and susceptible to crop interference and jamming. Other systems use optical sensors that can become blocked by crop material during use. Still further systems rely on the speed of a rear roller to monitor the motion of the bale. However, these types of systems are functional in operation and expensive the implement.

SUMMARY

In one implementation, a bale drop detection system for use with a baler having a rear aperture, the bale drop detection system including a bale chute coupled to the rear aperture of the baler, where the bale chute is configured to support a bale ejected from the rear aperture thereon, a first member operably connected to the bale chute, where the first member is elastically deformable between a first position in which the bale chute is empty or partially loaded and a second position in which the bale chute is fully loaded with the bale, a sensor providing output that is proportional to the magnitude of the deformation of the first member, where the loads applied to the bale chute are not transferred through the sensor, and a controller in communication with the sensor and configured to measure at least one of the magnitude of the deformation of the first member and rate of deformation of the first member.

In another implementation, a bale drop detection system for use with a baler having a rear aperture, the bale drop detection system including a bale chute coupled to the rear aperture of the baler, where the bale chute is configured to support a bale ejected from the rear aperture thereon, a first member operably connected to the bale chute, where the first member is elastically deformable between a first position in which the bale chute is empty or partially loaded and a second position in which the bale chute is fully loaded with the bale, a sensor providing output that is proportional to the magnitude of the deformation of the first member, where the loads applied to the bale chute are not transferred through the sensor, and a controller in communication with the sensor and configured to measure the magnitude of the deformation of the first member and a rate of deformation of the first member, the controller having a memory, and a set of conditions associated with the rate of change of the deformation of the first member stored in the memory of the controller, where the controller determines a bale drop event has occurred when the rate of change of deformation of the first member satisfies at least one condition of the set of conditions stored in the memory of the controller.

In another implementation, a bale drop detection system for use with a baler having a rear aperture, the bale drop detection system including a bale chute coupled to the rear aperture of the baler, where the bale chute is configured to support a bale ejected from the rear aperture thereon, a sensor providing output that is proportional to the magnitude of a load applied to the bale chute, where the load applied to the bale chute is not transferred through the sensor, and a controller in communication with the sensor and configured to determine the magnitude of the load applied to the bale chute and a rate of change of the magnitude of the load applied to the bale chute.

Other aspects of the disclosure will become apparent by consideration of the detailed description and accompanying drawings.

DETAILED DESCRIPTION

Before any implementations of the disclosure are explained in detail, it is to be understood that the disclosure is not limited in its application to the details of the formation and arrangement of components set forth in the following description or illustrated in the accompanying drawings. The disclosure is capable of supporting other implementations and of being practiced or of being carried out in various ways.

The disclosure relates to a baler, and more particularly to a baler having a bale detection mechanism. More specifically, the bale drop detection mechanism includes a controller able detect a bale drop event (e.g., when a bale falls from the baler onto a support surface) based at least in part on the force of the mass of the bale positioned on the bale chute.

Figure 1:
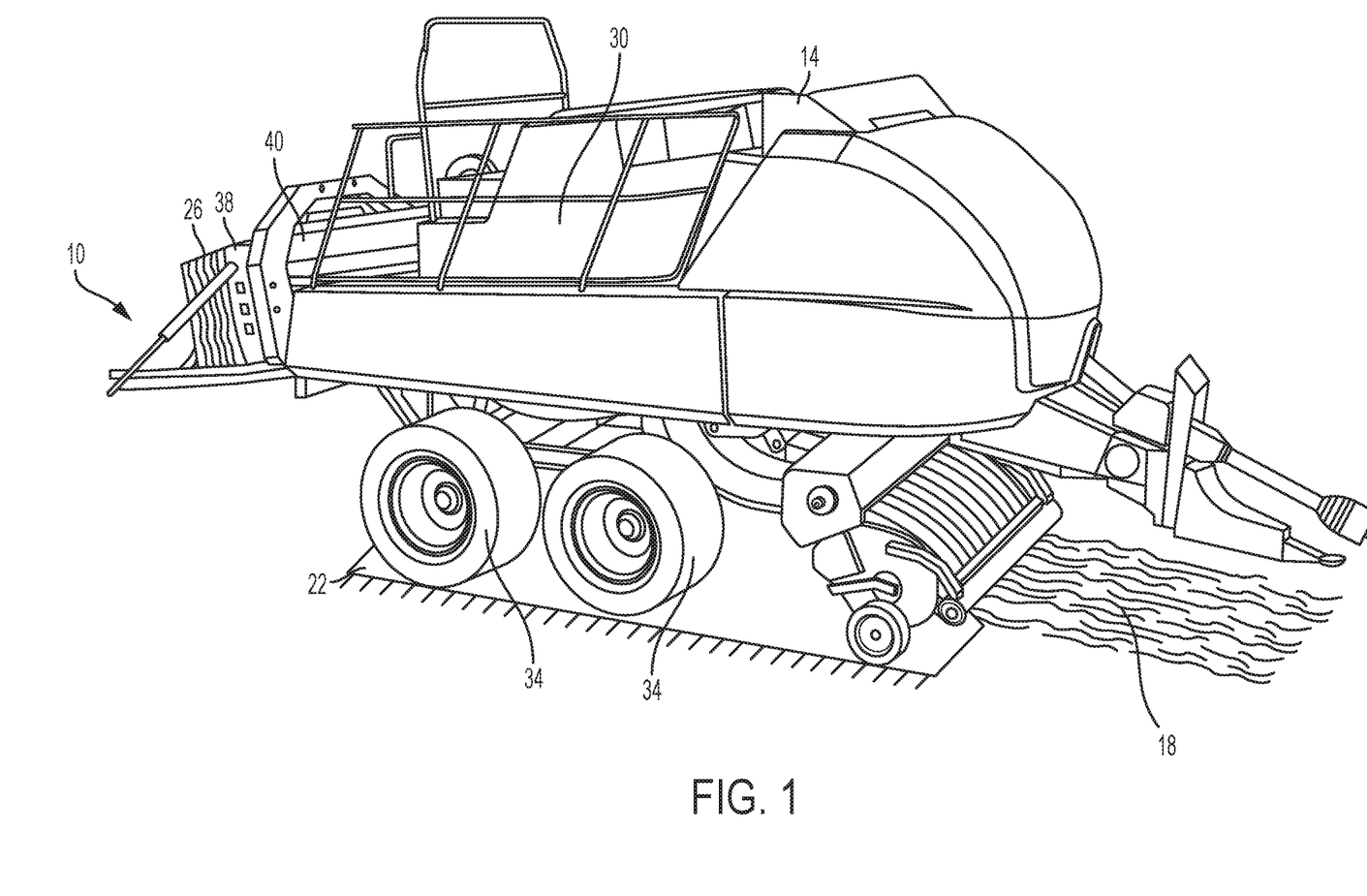
FIG. 1 is a perspective view of a baler having a bale drop detection mechanism installed thereon.

Referring to FIG. 1, a bale drop detection system 10 is mounted on a baler 14. The baler 14 is configured to collect crop material 18 from the support surface 22 (i.e., the field), process the crop material 18 into individual bales 26, then eject the completed bale 26 from the baler 14 where the completed bale 26 is ultimately positioned on the support surface 22 for subsequent pickup and processing. In the illustrated implementation, the baler 14 includes a body 30, a set of wheels 34 mounted on the body 30, and a rear aperture 38 at the rear end 40 of the baler 14 through which the completed bale 26 is ejected. During use, the baler 14 is configured to produce generally rectangular crop packages, e.g., square bales 26, from an agricultural field. The baler 14 may produce crop packages from hay, corn stalks, and the like.

Figure 2:
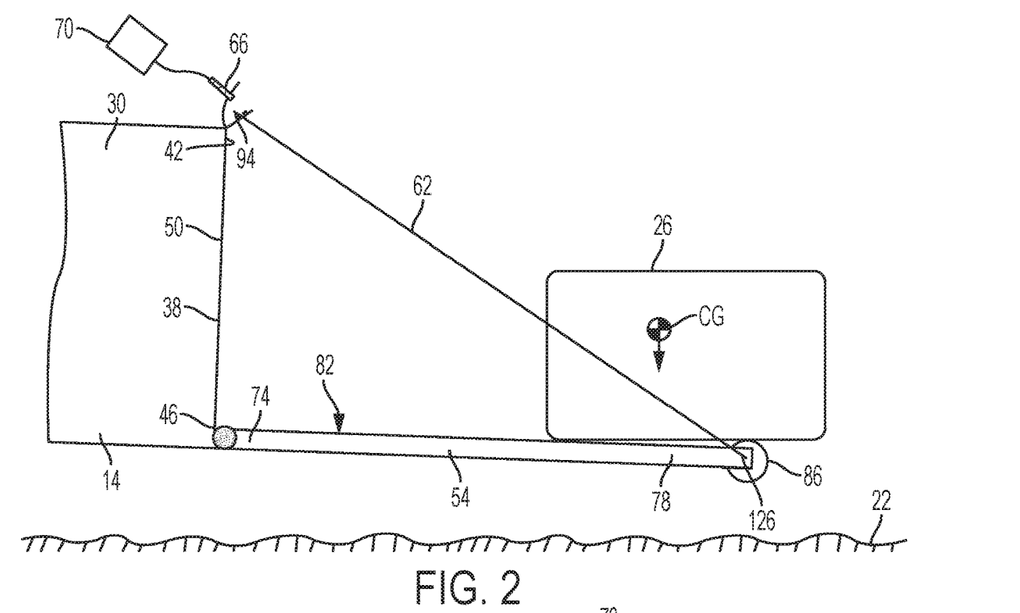
FIG. 2 is a side view of the bale drop detection mechanism installed on the baler of FIG. 1.

Illustrated in FIG. 2, the rear aperture 38 of the baler 14 is substantially rectangular in cross-sectional shape being sized to allow a bale 26 to pass therethrough. The rear aperture 38 is defined by a perimeter that includes an upper edge 42, a lower edge 46 opposite the upper edge 42, and a pair of side edges 50 extending between the upper edge 42 and the lower edge 46.

Referring to FIG. 2, the bale drop detection mechanism 10 is coupled to the rear end 40 of the baler 14 and is configured to help convey completed bales 26 ejected from the rear aperture 38 to the support surface 22. The bale drop detection mechanism 10 includes a bale chute 54 pivotally coupled to the rear 40 of the baler 14, a first bracket 58 fixedly coupled to the rear 40 of the baler 14, a support member 62 extending between the first bracket 58 and the bale chute 54, a sensor 66 configured to detect the weight applied to the bale chute 54, and a controller 70 in operable communication with the sensor 66 and configured to detect when a bale 26 drops from the bale chute 54.

The bale chute 54 of the bale drop detection mechanism 10 is substantially elongated in shape having a first end 74 pivotably coupled to the lower edge 46 of the rear aperture 38 of the baler 14, and a second end 78 opposite the first end 74. The bale chute 54 also includes a substantially planar upper surface 82 configured to support completed bales 26 positioned thereon. In alternative implementations, the upper surface 82 of the bale chute 54 may include a plurality of rollers (not shown), a conveyor belt (not shown), and the like to help aid the movement of the bale 26 across the upper surface 82.

The bale chute 54 also includes a roller 86 rotatably coupled to the second end 78. The roller 86 is configured to aid the movement of the bale 26 across the upper surface 82 of the bale chute 54 and also minimize the amount of damage and friction applied to the bale 26 as it drops over the second end 78 of the bale chute 54. In the illustrated implementation, the roller 86 is mounted to the second end 78 for free rotation with respect to the bale chute 54, however in alternative implementations, the roller 86 may be driven by a motor and the like (not shown) to drive the bale 26 over the upper surface 82.

Figure 3A:
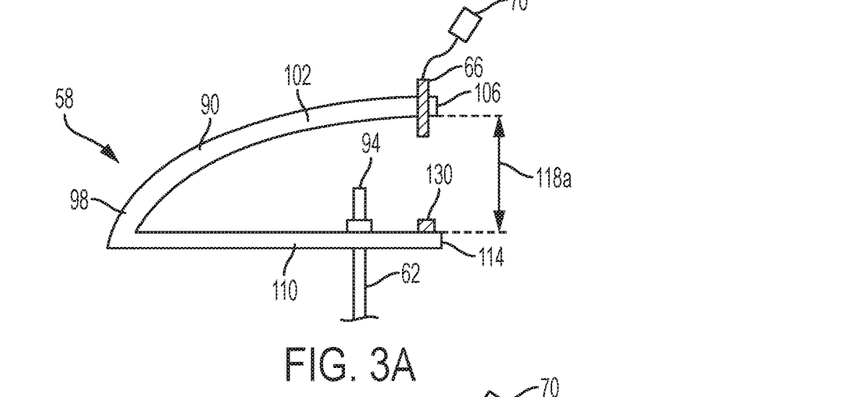
FIGS. 3A and 3B illustrate a first bracket of the bale drop detection mechanism of FIG. 2 in various configurations.
Figure 3B:
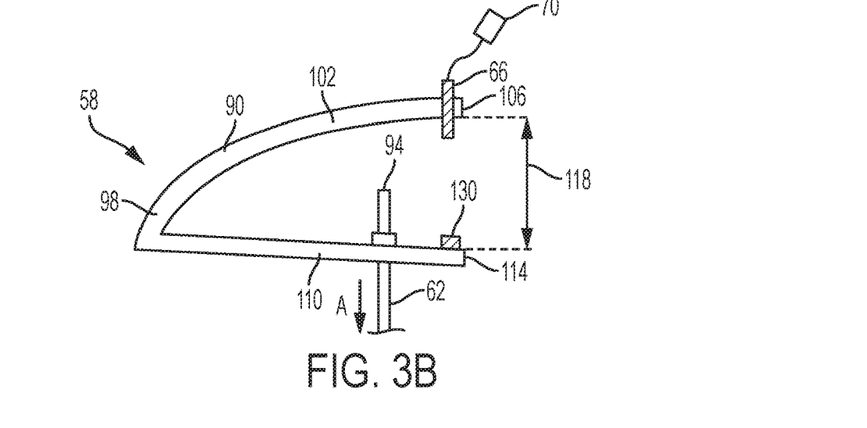

Illustrated in FIGS. 3A-3B, the first bracket 58 of the bale drop detection mechanism 10 is substantially "V" shaped having a body 90 that is fixedly coupled to the upper edge 42 of the baler 14 (see FIG. 2). During use, the first bracket 58 is configured to act as a mounting point for a first end 94 of the support member 62 (described below) transmitting any forces (e.g., tension) within the support member 62 to the rear 40 of the baler 14. In the illustrated implementation, the first bracket 58 is also configured to support the sensor 66 thereon.

The body 90 of the first bracket 58 includes a base point 98, a first leg 102 extending from the base point 98 to define a first distal end 106, and a second leg 110 extending from the base point 98 to define a second distal end 114 spaced a bracket distance 118 from the first distal end 106. In the illustrated implementation, the body 90 of the first bracket 58 is formed from a single piece of material having sufficient elasticity and strength to undergo multiple cycles of deformation without permanently bending or breaking.

When assembled, the base point 98 is fixedly mounted to the rear 40 of the baler 14 (e.g., by welding, a fastener, and the like, not shown) such that when a force is applied to the second leg 110 (e.g., via the support member 62), the second leg 110 transmits the force to the baler 14, bypassing the first leg 102, and causing the second leg 110 to elastically deform. The deformation of the second leg 110, in turn, causes the second distal end 114 to move relative to the first distal end 106 of the first leg 102. More specifically, the second distal end 114 moves between a rest position (see FIG. 3A), where no force is applied to the second leg 110, and one or more deformed positions (see FIG. 3B), where a force is applied to the second leg 110 in a first direction A. Stated differently, the body 90 of the first bracket 58 includes a first member (e.g., the second leg 110), and a non-deforming member (e.g., the first leg 102), and where the distance between the first member and the non-deforming member changes based at least in part upon the magnitude of the load applied to the first member (e.g., by the bale chute 54 via the support member 62).

For example, when no force is applied to the second leg 110 of the first bracket 58, the first distal end 106 is a first bracket distance 118*a* (e.g., a rest distance) from the second distal end 110 (see FIG. 3A). When a force is applied to the second leg 110 in a first direction A (e.g., via the support member 62; see FIG. 3B), the second leg 110 elastically deforms causing the bracket distance 118 to increase. Generally speaking, the larger the force applied to the second leg 110, the larger the bracket distance 118 will become. When that force is removed, the elasticity of the material forming the first bracket 58 causes the second leg 110 to elastically return to its initial rest position, restoring the bracket distance 118 to its initial value (see FIG. 3A).

In the illustrated implementation, the second leg 110 of the first bracket 58 includes a constant substantially rectangular cross-sectional shape along its length. However, in alternative implementations, the cross-sectional shape of the second leg 110 may be changed to produce different elastic deformation characteristics (e.g., affect how much the bracket distance 118 will increase for a given force applied to the second leg 110). In other implementations, the cross-sectional shape of the second leg 110 may vary along its length. In still further implementations, braces or straps formed from different materials may also be used to vary the elastic deformation characteristics of the second leg 110.

Figure 4:
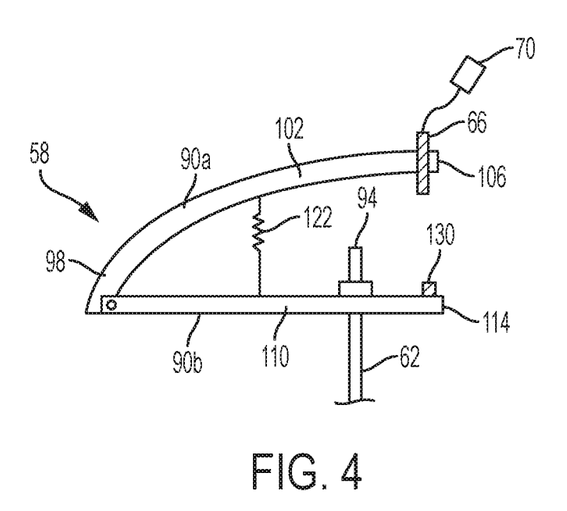
FIG. 4 illustrates an alternative implementation of the first bracket of FIGS. 3A and 3B.

While the illustrated first bracket 58 is formed from a single piece of material, it is to be understood that in alternative implementations, the first bracket 58 may be formed from two members 90*a*, 90*b*, pivotably coupled to one another (see FIG. 4). In such implementations, a biasing member or spring 122 may be used to dictate the rate at which the second distal end 114 moves with respect to the first distal end 106 under load.

Referring again to FIG. 2, the support member 62 of the bale drop detection mechanism 10 is substantially elongated in shape having a first end 94 coupled to the second leg 110 of the first bracket 58, and a second end 126 opposite the first end 94 that is coupled to the second end 78 of the bale chute 54. During use, the support member 62 is configured to at least partially support the mass of the bale 26 positioned on the bale chute 54. More specifically, the support member 62 conveys a force due to the mass of the bale 26 to the baler 14 via the second leg 110 of the first bracket 58, undergoing tension. Generally speaking, the larger the force applied to the upper surface 82 of the bale chute 54 (e.g., by the mass of a bale 26), the larger the tension force experienced by the support member 62 and the larger the force exerted by the support member 62 against the first bracket 58. In the illustrated implementation, the support member 62 includes a chain or cable, however in alternative implementations a solid bracket, actuator arm, and the like may be used.

Illustrated in FIGS. 2, 3A and 3B, the bale drop detection mechanism 10 also includes a sensor 66 configured to provide an output that is proportional to the magnitude of the force applied to the upper surface 82 of the bale chute 54 without having the force transferred through the sensor 66 itself. More specifically, the sensor 66 is coupled to the first leg 102 of the bracket 58 proximate the first distal end 106. During use, the sensor 66 directly measures the distance between the first distal end 106 and the second distal end 114 (e.g., the bracket distance 118), and as a corollary, indirectly monitors the amount of force being applied to the upper surface 82 of the bale chute 54 (e.g., by the mass of a bale 26 positioned thereon). More specifically, the force applied to the upper surface 82 of the bale chute 54 causes tension in the support member 62 which in turn applies a force to the second leg 110 of the bracket 58 in the first direction A. The force applied to the bracket 58 in the first direction A, in turn, causes the second leg 110 to deform relative to the first leg 102 increasing the bracket distance 118. Generally speaking, the larger the force applied to the second leg 110 of the bracket 58, the larger the bracket distance 118. In some implementations, the sensor 66 includes a target 130 coupled to the second distal end 114 to aid measuring the bracket distance 118. In alternative implementations, the sensor 66 may be coupled to the second distal end 114, while the target 130 is coupled to the first distal end 106.

In the illustrated implementation, the sensor may include a contact or non-contact style distance measurement system such as a hall-effect plunger style sensor, a hall-effect non-contact sensor, an analog proximity sensor, and the like. In still other implementations, the sensor 66 may include a tension sensor coupled directly to the second leg 110 of the bracket 58.

Illustrated in FIGS. 1, 2, 3A, and 3B, the controller 70 of the bale drop detection mechanism 10 is in operable communication with the sensor 66 and configured to detect a bale drop event (e.g., when the bale 26 falls from the bale chute 54 and is completely positioned on the support surface 22). More specifically, the controller 70 of the bale drop detection mechanism is configured to detect a bale drop event based at last partially on the force applied to the upper surface 82 of the bale chute 54. During the baling process, the controller 70 receives a stream of information in the form of signals from the sensor 66 representing the magnitude of the force being applied to the upper surface 82 of the bale chute 54 by a bale 26 positioned thereon. The controller 70 then compiles the raw information received from the sensor 66, and processes it using one more algorithms to calculate when a bale drop event has occurred. In the present implementation, the controller 70 equates a sudden reduction in bracket distance 118 (e.g., a sudden reduction in force applied to the upper surface 82 of the bale chute 54) with a bale drop event.

In some implementations, the controller 70 may include one or more "conditions" stored in the memory thereof. In such implementations, the controller 70 monitors the information provided by the sensor 66 and, when a pre-determined set of the conditions is met, determines that a drop event has occurred. The conditions may depend upon, but are not limited to, the rate of change of the magnitude of deformation of the second leg 110 (e.g., the rate of change of the bracket distance 118), the magnitude of deformation of the second leg 110 (e.g., the variation of from the first bracket distance 118a), and the like.

In the illustrated implementation, the controller 70 includes two conditions stored in the memory thereof and is configured to determine a drop event has occurred when both conditions have been met. In such an implementation, the first condition is met when the magnitude of the deformation of the second leg 110 decreases from a preset greater value ($MAG_{MAX}$) to a preset lesser value ($MAG_{MIN}$) in a period of time that is less than a present maximum period of time ($TIME_{MAX}$) (e.g., Time from $MAG_{MAX}$ to $MAG_{MIN}$ occurs in less than $TIME_{MAX}$). Furthermore, the second condition is met when the magnitude of the deformation of the second leg remains at or near the preset lesser value ($MAG_{MIN}$) for more than a present minimum value of time ($TIME_{MIN}$) (e.g., Time at or about $MAG_{MIN}$ is greater than $TIME_{MIN}$).

During the baling operation, a bale 26 is ejected from the rear aperture 38 of the baler 15 causing a portion of the bale's mass to apply a force onto the upper surface 82 of the bale chute 54. As the bale 26 continues to exit the rear aperture 38, a greater proportion of the bale's mass is applied to the upper surface 82 of the bale chute 54 which the sensor 66 detects as a gradual increase in the bracket distance 118.

Once the entire bale 26 is positioned on the upper surface 82, the entire force of the bale's mass applied to the bale chute 54 which the sensor 66 detects as the bracket distance 118 remaining at a constant deformed distance. The bale 26 then continues to move down the bale chute 54 (e.g., toward the second end 78) until the bale's the center of gravity CG is positioned beyond the second end 78 of the bale chute 54. Once the center of gravity CG is beyond the second end 78, the bale 26 will rotate over the second end 78 and fall onto the support surface 22. This last action is detected by the controller 70 as a rapid drop in bracket distance 118. In instances where the bale chute 54 is left empty after the drop event, the drop event results with the bracket distance 118 returning to the initial distance 118a (e.g., the second leg 110 returns to the rest position; see FIG. 3A).

Upon detecting the drop event, the controller 70 may inform the user (e.g., via a user interface, not shown). After a lull period passes the cycle starts anew as a new bale 26 begins to emerge from the rear aperture 38.

Figure 5:
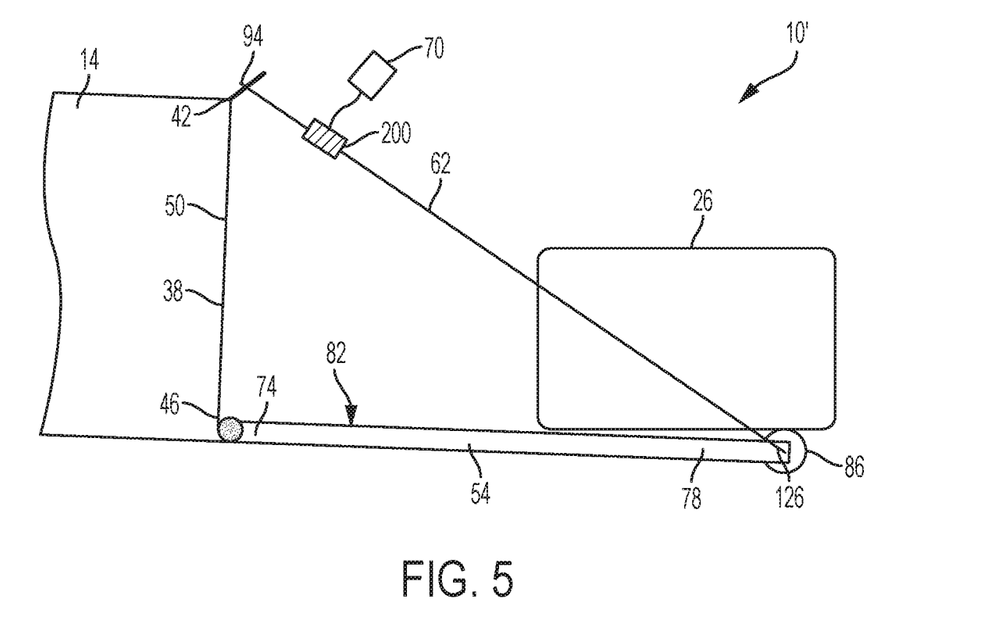
FIGS. 5-7 illustrate alternative implementations of the bale drop mechanism of FIG. 2.

FIG. 5 illustrates another implementation of the bale drop detection mechanism 10'. The bale drop detection mechanism 10' is substantially similar to bale drop detection mechanism 10 and therefore only the differences will be described herein. The bale drop detection mechanism 10' includes a sensor 200 coupled to the support member 62. The sensor 200 is configured to directly monitor tension within the support member 62, and as a corollary, indirectly monitor the amount of force being applied to the upper surface 82 of the bale chute 54. More specifically, the force due to the mass of the bale 26 on the upper surface 82 causes tension in the support member 62. During use, the controller 70 detect a bale drop event based at least in part on the force applied to the upper surface 82 of the bale chute 54.

Figure 6:
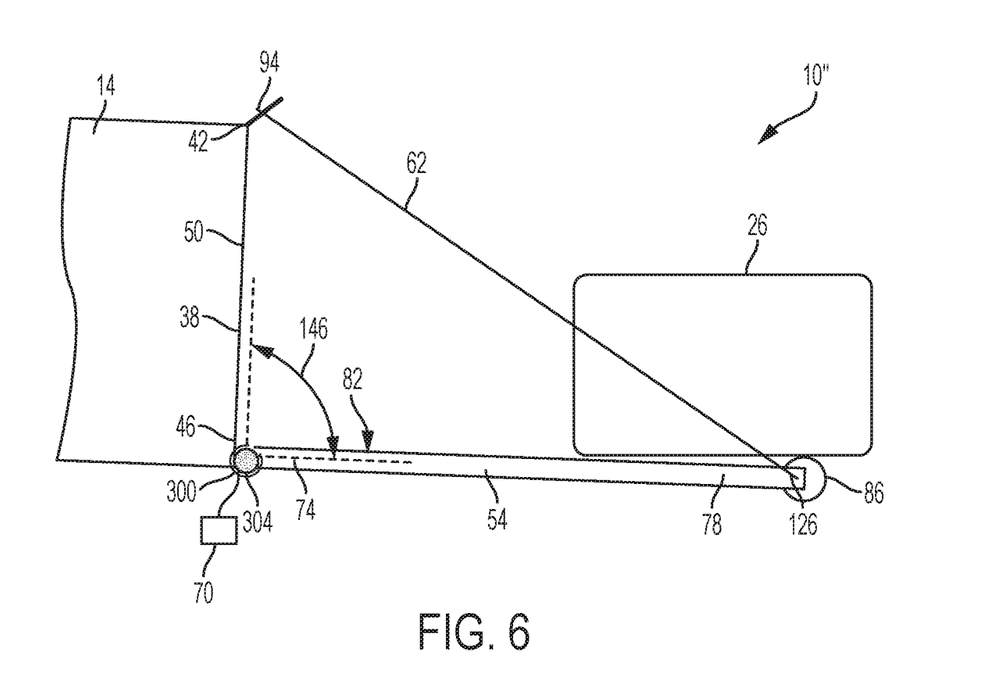

FIG. 6 illustrates another implementation of the bale drop detection mechanism 10". The bale drop detection mechanism 10" is substantially similar to the bale drop detection mechanism 10 and therefore only the differences will be described herein. The bale drop detection mechanism 10" includes a sensor 300 coupled to the first end 74 of the bale chute 54. The sensor 300 is configured to directly monitor the force exerted at the joint 304 between the first end 74 of the bale chute 54 and the lower edge 46 of the rear aperture 38, and as a corollary, indirectly monitor the amount of force being applied to the upper surface 82 of the bale chute 54. More specifically, the force due to the mass of the bale 26 on the upper surface 82 is proportional to the resulting force at the joint 304 between the first end 74 and the lower edge 46 of the rear aperture 38. During use, the controller 70 may detect a bale drop event based at least in part on the force applied to the upper surface 82 of the bale chute 54.

In still other implementations, the sensor 300 may be configured to directly monitor the relative rotational position between the bale chute 54 and the rear aperture 38 (e.g., the bale chute angle 146; see FIG. 6), and as a corollary, indirectly monitor the amount of force being applied to the upper surface 82 of the bale chute 54. In such implementations, the greater the force applied to the upper surface 82, the larger the bale chute angle 146.

Figure 7:
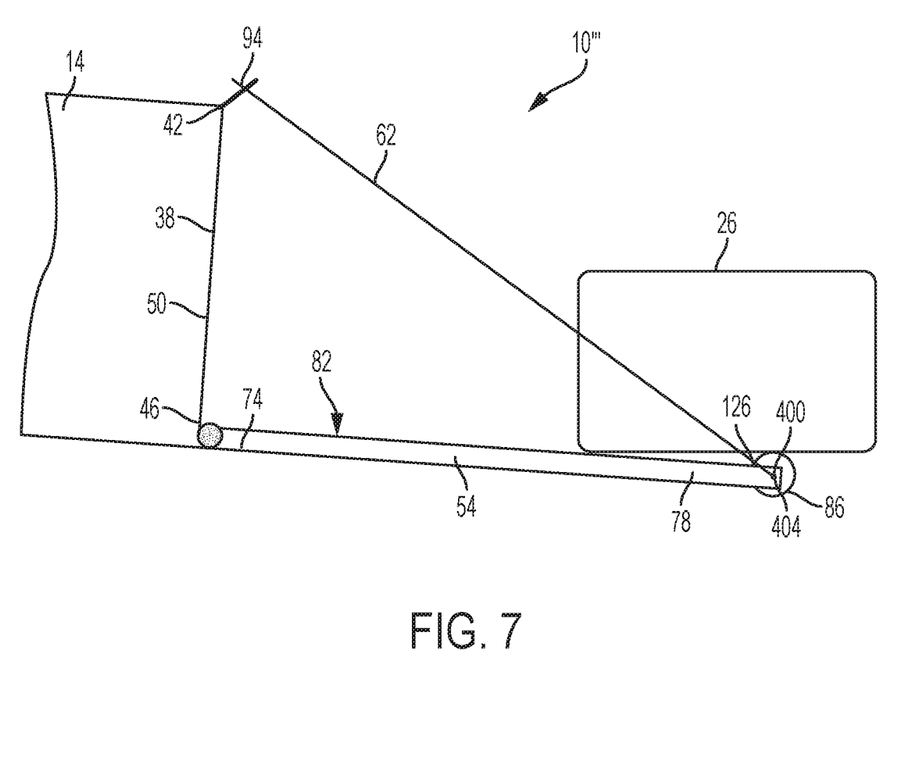

FIG. 7 illustrates another implementation of the bale drop detection mechanism 10′′′. The bale drop detection mechanism 10′′′ is substantially similar to the bale drop detection mechanism 10 and therefore only the differences will be described herein. The bale drop detection mechanism 10′′′ includes a sensor 400 coupled proximate the second end 78 of the bale chute 54. The sensor 400 is configured to directly monitor the force exerted at the joint 404 between the second end 126 of the support member 62 and the second end 78 of the bale chute 54, and as a corollary, indirectly monitor the amount of force being applied to the upper surface 82 of the bale chute 54. More specifically, the force of the mass of the bale 26 on the upper surface 82 is proportional to the resulting force at the joint between the second end 126 of the support member 62 and the second end 78 of the bale chute 54. During use, the controller 70 may detect a bale drop event based at least in part on the force applied to the upper surface 82 of the bale chute 54.

What is claimed is:

1. A bale drop detection system for use with a baler having a rear aperture, the bale drop detection system comprising:
    a bale chute coupled to the rear aperture of the baler, wherein the bale chute is configured to support a bale ejected from the rear aperture thereon;
    a first member operably connected to the bale chute, wherein the first member is elastically deformable between a first position in which the bale chute is empty or partially loaded and a second position in which the bale chute is fully loaded with the bale;
    a sensor providing output that is proportional to the magnitude of the deformation of the first member, wherein the loads applied to the bale chute are not transferred through the sensor; and
    a controller in communication with the sensor and configured to measure at least one of the magnitude of the deformation of the first member and rate of deformation of the first member.

2. The bale drop detection system of claim 1, wherein the sensor measures distance.

3. The bale drop detection system of claim 2, wherein the distance measured by the sensor is the magnitude of the deformation of the first member.

4. The bale drop detection system of claim 1, wherein the sensor is mounted on a non-deforming member and configured to measure the distance between the first member and the non-deforming member.

5. The bale drop detection system of claim 4, wherein the distance between the first member and the non-deforming member changes based at least in part upon the magnitude of the load applied to the bale chute.

6. The bale drop detection system of claim 1, wherein the sensor is mounted on the first member and configured to measure the distance between the first member and a non-deforming member.

7. The bale drop detection system of claim 6, wherein the distance between the first member and the non-deforming member changes based at least in part upon the magnitude of the load applied to the bale chute.

8. The bale drop detection system of claim 1, wherein the first member transfers at least a portion of forces applied to the bale chute to the rear aperture of the baler.

9. A bale drop detection system for use with a baler having a rear aperture, the bale drop detection system comprising:
    a bale chute coupled to the rear aperture of the baler, wherein the bale chute is configured to support a bale ejected from the rear aperture thereon;
    a first member operably connected to the bale chute, wherein the first member is elastically deformable between a first position in which the bale chute is empty or partially loaded and a second position in which the bale chute is fully loaded with the bale;
    a sensor providing output that is proportional to the magnitude of the deformation of the first member, wherein the loads applied to the bale chute are not transferred through the sensor; and
    a controller in communication with the sensor and configured to measure the magnitude of the deformation of the first member and a rate of deformation of the first member, the controller having memory; and
    a set of conditions associated with the rate of change of the deformation of the first member stored in the memory of the controller;
    wherein the controller determines a bale drop event has occurred when the rate of change of deformation of the first member satisfies at least one condition of the set of conditions stored in the memory of the controller.

10. The bale drop detection system of claim 9, wherein one condition of the set of conditions is satisfied when the magnitude of the deformation of the first member decreases from a preset greater value to a preset lesser value over a period of time that is less than a preset maximum period of time.

11. The bale drop detection system of claim 10, wherein another condition of the set of conditions is satisfied when the magnitude of the deformation of the first member remains at or near the preset lesser value for more than a preset minimum period of time.

12. The bale drop detection system of claim 11, wherein the preset maximum period of time is one second, and the preset minimum period of time is one second.

13. The bale drop detection system of claim 9, wherein the first member is a first distance from a non-deforming member, and wherein the first distance changes proportional to the change in the magnitude of the deformation of the first member.

14. The bale drop detection system of claim 13, wherein the sensor is coupled to one of the non-deforming member and the first member.

15. The bale drop detection system of claim 13, wherein the non-deforming member and the first member are formed integrally.

16. The bale drop detection system of claim 13, further comprising the baler, wherein the bale chute is fully supported by the baler.

17. The bale drop detection system of claim 13, wherein at least a portion of forces applied to the bale chute are conveyed to the baler via the first member.

18. A bale drop detection system for use with a baler having a rear aperture, the bale drop detection system comprising:
    a bale chute coupled to the rear aperture of the baler, wherein the bale chute is configured to support a bale ejected from the rear aperture thereon;
    a sensor providing output that is proportional to the magnitude of a load applied to the bale chute, wherein the load applied to the bale chute is not transferred through the sensor; and
    a controller in communication with the sensor and configured to determine the magnitude of the load applied to the bale chute and a rate of change of the magnitude of the load applied to the bale chute.

19. The bale drop detection mechanism of claim 18, further comprising a bracket including a base point, a first leg extending from the base point, and a second leg extending from the base point.

20. The bale drop detection mechanism of claim 18, wherein the first leg is operatively coupled to the bale chute and the base point is coupled to the rear aperture of the baler, and wherein the magnitude of a deformation of the first leg is proportional to the magnitude of the load applied to the bale chute.

* * * * *